US012806672B2

(12) United States Patent
Li et al.

(10) Patent No.: US 12,806,672 B2
(45) Date of Patent: Nov. 24, 2026

(54) METHOD FOR MANUFACTURING SOLID-STATE COMPOSITE ADDITIVE FOR HIGH-PERFORMANCE STRUCTURAL COMPONENT

(71) Applicant: AVIC MANUFACTURING TECHNOLOGY INSTITUTE, Beijing (CN)

(72) Inventors: Zhiqiang Li, Beijing (CN); Bing Zhao, Beijing (CN); Fulong Chen, Beijing (CN)

(73) Assignee: AVIC MANUFACTURING TECHNOLOGY INSTITUTE, Beijing (CN)

(*) Notice: Subject to any disclaimer, the term of this patent is extended or adjusted under 35 U.S.C. 154(b) by 515 days.

(21) Appl. No.: 18/308,845

(22) Filed: Apr. 28, 2023

(65) Prior Publication Data

US 2023/0264257 A1 Aug. 24, 2023

Related U.S. Application Data

(63) Continuation of application No. PCT/CN2021/125830, filed on Oct. 22, 2021.

(30) Foreign Application Priority Data

Nov. 2, 2020 (CN) ......................... 202011204437.9

(51) Int. Cl.
*B33Y 10/00* (2015.01)
*B21B 3/00* (2006.01)
*B33Y 70/10* (2020.01)

(52) U.S. Cl.
CPC ................ *B21B 3/00* (2013.01); *B33Y 10/00* (2014.12); *B33Y 70/10* (2020.01)

(58) Field of Classification Search
CPC ........ B21C 23/001; B21C 23/02; B21C 31/00
See application file for complete search history.

(56) References Cited

U.S. PATENT DOCUMENTS

2021/0053283 A1* 2/2021 Liu ......................... B29C 48/06
2021/0402687 A1* 12/2021 Anegawa ................ B29C 71/02

FOREIGN PATENT DOCUMENTS

CN 103243283 A 8/2013
CN 107378229 A 11/2017
CN 112439902 A 3/2021

OTHER PUBLICATIONS

First Office Action issued in Chinese Patent Application No. 202011204437.9; mailed Apr. 25, 2022; 12 pgs.

(Continued)

*Primary Examiner* — Debra M Sullivan
(74) *Attorney, Agent, or Firm* — HAUPTMAN HAM, LLP

(57) ABSTRACT

A solid composite additive manufacturing method for high-performance structural component includes: the rod-shaped raw material of solid composite additive is heated to a solid solution temperature, wherein the rod-shaped raw material is prepared by casting method; the rod-shaped raw material of the solid composite additive after solid solution is loaded into the extrusion die and extruded into a set shape; The raw materials of the extruded solid composite additive are laid on the base plate layer by layer according to the track by rolling or other pressure connection methods to form the prefabricated billet of the solid composite additive. The prefabricated billet is processed by numerical control to obtain metal part. The solid composite additive manufacturing method refines the grain, breaks the oxide film, and improves the mechanical properties of the structural component.

7 Claims, 2 Drawing Sheets

(56) References Cited

OTHER PUBLICATIONS

International Search Report and Written Opinion issued in International Patent Application No. PCT/CN2021/125830, mailed Jan. 19, 2022; 14 pgs.

* cited by examiner

S1: the rod-shaped raw material of the solid composite additive is heated to a solid solution temperature

↓

S2: the rod-shaped raw material of the solid composite additive after solid solution is loaded into the extrusion die and extruded into a set shape

↓

S3: The raw materials of the extruded solid composite additive are laid on the base plate layer by layer according to the track by rolling or other pressure connection methods to form the prefabricated billet of the solid composite additive

↓

S4: The prefabricated billet is processed by numerical control to obtain metal part

Fig. 1

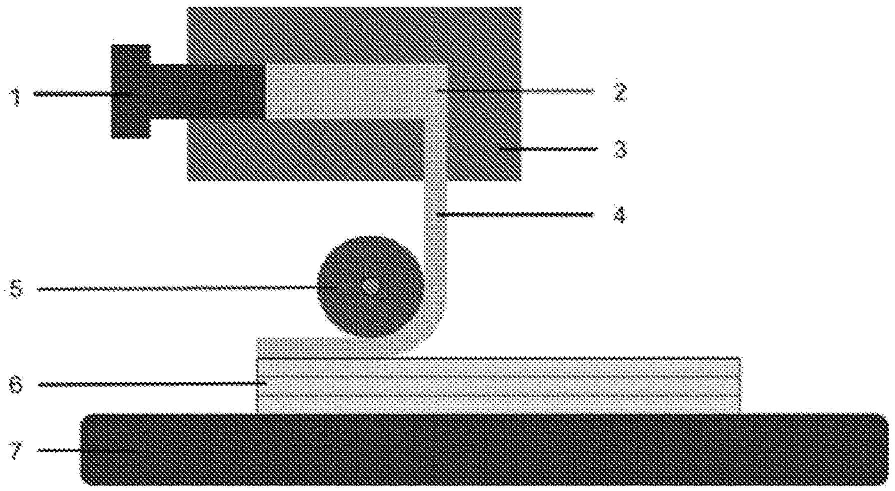

Fig. 2

METHOD FOR MANUFACTURING SOLID-STATE COMPOSITE ADDITIVE FOR HIGH-PERFORMANCE STRUCTURAL COMPONENT

RELATED APPLICATIONS

The present application is a Continuation of International Application Number PCT/CN2021/125830 filed Oct. 22, 2021, and claims priority to Chinese Application Number 202011204437.9 filed Nov. 2, 2020, the disclosures of which are hereby incorporated by reference in their entireties.

TECHNICAL FIELD

The present invention relates to the technical field of metal plastic forming, in particular to a method for manufacturing a solid-state composite additive for high-performance structural component.

BACKGROUND

The existing additive manufacturing methods can only be applied to some specific metals with good weldability. For materials with poor weldability, it is easy to produce metallurgical defects such as tissue inhomogeneity, hot cracks, holes, etc. during the additive manufacturing, resulting in unacceptable or unpredictable performance. In the curing process of additive manufacturing, the initial equilibrium phase first precipitates from the liquid metal, and the sudden drop of temperature causes the formation of dendrites on the solid-liquid interface, which produces holes easily and leads to the uneven mechanical properties of the structural component. In addition, during the curing, due to the thermal contact and the thermal mismatch between the adjacent materials, it is easy to generate hot cracks. The non-uniform temperature field after the forming of the part will also produce large residual thermal stress, which will lead to the deformation and warpage of the part. When different layers are formed, they will be subjected to the cyclic thermal gradient effect of heating and cooling, resulting in unforeseen or unavoidable defects, which seriously limit the range of applicable materials for additive manufacturing.

Additive manufacturing under solid conditions can avoid the cladding of metal materials, reduce the thermal temperature gradient during solidification, and effectively avoid various metallurgical defects. There are two common methods of solid additive manufacturing. One is the friction stir additive manufacturing technology of MELD company. The friction stir additive manufacturing technology realizes deformation and connection under solid conditions, and does not require time-consuming follow-up processing after forming, such as hot isostatic pressing process, or sintering to improve its performance. It is almost applicable to all kinds of metal materials, including various aluminum alloys. However, the main problem and deficiency of the friction stir additive manufacturing is that during the forming, there will be severe friction between the mixing head and the material, which cause severe wear of the mixing head easily. Hard inclusions will be introduced into the formed parts, resulting in a significant reduction in the mechanical properties of the parts, especially the fatigue properties. Ultrasonic Additive Manufacturing (UAM) is another solid additive manufacturing method. This method uses ultrasonic welding to realize the connection between layers of metal, which has low requirements for environment and mold, and is an environmentally friendly metal forming method. However, the UAM method can only connect the foil, and the manufacturing efficiency is affected by the weldable thickness of each layer. Another problem is that the rough surface of the foil easily causes that the formed parts form interlayer holes when layers are connected therebetween.

Therefore, the inventor provides a solid composite additive manufacturing method for high-performance structural component.

SUMMARY

(1) Technical Problem to be Solved

The embodiments of the present invention provide a solid composite additive manufacturing method for high-performance structural component. The additive manufacturing is attained by means of extrusion and rolling pressure connection after being pretreated under the material melting temperature, and the cast metal material is directly formed into a structural component with thermal mechanical processing tissue by solid composite additive, which solves the technical problem that the mechanical properties of the structural component are reduced due to the easy introduction of high density inclusions in the structural component during the solid additive manufacturing.

(2) Technical Solution

The embodiments of the present invention provide a solid composite additive manufacturing method for high-performance structural component, which includes the following steps:

The cast rod-shaped raw material of the solid composite additive is heated to the solid solution temperature;

The rod-shaped raw material of the solid composite additive after solid solution is loaded into the extrusion die and extruded into a set shape;

The raw materials of the extruded solid composite additive are laid on the base plate layer by layer according to the track by rolling method to form a prefabricated billet of the solid composite additive;

The prefabricated billet is processed by numerical control to obtain metal part.

Further, the solid solution temperature is 0.3Tm~0.75Tm, wherein, Tm is the melting point of the raw material of the solid composite additive.

Further, the rod-shaped raw material of the solid composite additive after solution is loaded into the extrusion die and extruded into the set shape, specifically:

In the vacuum environment or argon environment, the raw materials of the solid composite additive after solution are subjected to lateral extrusion through the extrusion head and extrusion die; The extrusion ratio of lateral extrusion is 5~15.

Further, the raw materials of the extruded solid composite additive are laid on the base plate layer by layer according to the track by rolling method to form the prefabricated billet of the solid composite additive, including the following steps:

Under conditions of set temperature and set deformation amount, the raw material of the extruded solid composite additive is pressed by roller or punch;

When the raw materials of the extruded solid composite additive are connected with the base plate, the raw materials of the extruded solid composite additive are stacked layer by layer according to the track to form the prefabricated billet of the solid composite additive.

Further, the set temperature is from room temperature to 0.75 Tm, where Tm is the melting point of the raw material of the solid composite additive.

Further, the set deformation amount is 15%~60%.

Further, when the raw material of the extruded solid composite additive is pressed by the roller, the integrated pressure connection of two symmetrical rollers is adopted.

Further, after the raw materials of the extruded solid composite additive are stacked layer by layer according to the track to form the prefabricated billet of the solid composite additive, it further includes:

The prefabricated billet of the formed solid composite additive is subjected to subsequent heat treatment.

(3) Beneficial Effect

To sum up, the present invention realizes additive manufacturing by extrusion and rolling pressure connection after pre-processing at the melting temperature of the material. It can refine the grains by angular extrusion, break the oxide film on the surface, and attain the connection of the interlayer metals by rolling or other pressure connection methods. The as-cast metal materials are directly formed into the structural component with uniform thermal mechanical processing tissue by solid composite additive, which solves the technical problem that the mechanical properties of the structural component are reduced due to the easy introduction of high density inclusions in the structural component during the solid additive manufacturing, eliminates metallurgical defects, has good strength, plasticity, toughness, and fatigue resistance, and is especially suitable for difficult-to-weld materials.

BRIEF DESCRIPTION OF THE DRAWINGS

In order to more clearly explain the technical solution of the embodiments of the present invention, the following will briefly introduce the drawings used in the embodiments of the present invention. It is obvious that the drawings described below are only some embodiments of the present invention. For the skilled person in the art, other drawings can also be obtained from these drawings without inventive work.

FIG. 1 is a flow diagram of the solid composite additive manufacturing method for a high-performance structural component provided by the embodiment of the present invention;

FIG. 2 is the principle diagram of the solid composite additive manufacturing for a high-performance structural component provided by the embodiment of the present invention;

In the figures:

Figure 3:
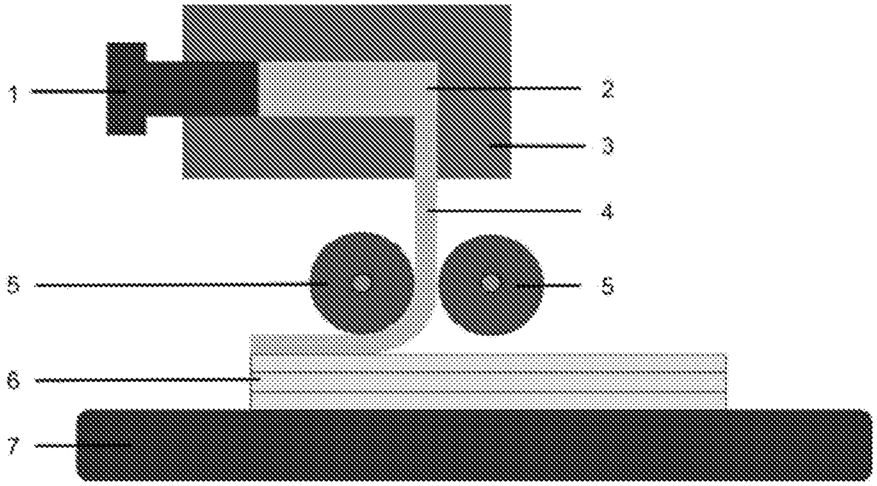
FIG. 3 is the principle diagram of the solid composite additive manufacturing for another high-performance structural component provided by the embodiment of the present invention.

1—extrusion head; 2—rod-shaped raw materials; 3—extrusion die; 4—narrow band; 5—roller; 6—prefabricated billet; 7—base plate.

DETAILED DESCRIPTION

The embodiments of the present invention will be further described in detail with the accompanying drawings and embodiments. The detailed description and drawings of the following embodiments are used to exemplify the principle of the present invention, but cannot be used to limit the scope of the present invention, that is, the present invention is not limited to the described embodiments, and covers any modification, replacement and improvement of parts, components and connection manners without departing from the spirit of the present invention.

It should be noted that the embodiments in the present application and the features in the embodiments can be combined with each other without conflict. The present application will be described in detail below with reference to the attached drawings and in combination with embodiments.

Commonly used metal additive manufacturing methods mainly include: SLM (Selective Laser Melting), EBM (Electron Beam Melting), SLS (Selective Laser Sintering), LMD (Laser Melting Deposition), WAAM (Wire Arc Additive Manufacturing), and PAW (Plasma Additive Manufacturing). These additive manufacturing methods generally use heat source to melt metal powder or wire, and then solidify to form the designed geometric shape. In the forming process, there is a transition process from liquid to solid, and the temperature gradient is large.

The existing additive manufacturing methods based on cladding have some shortcomings:

For the additive manufacturing method based on metal cladding, the single as-cast structure formed by the deposition after metal melting cannot obtain different structure states according to different requirements, cannot meet various requirements for performance, and cannot be used to manufacture key components such as aircraft frame, undercarriage and engine rotor;

Additive manufacturing technology using high-energy beam as heat source is costly, the size of the equipment is large, and forming efficiency needs to be improved.

The existing additive manufacturing methods based on solid friction welding also have some shortcomings:

The additive manufacturing technology based on stir friction welding needs to rely on the stir head to perform stir friction deformation and connection for the material. The wear of the stir head is serious, and it is easy to introduce high-density inclusions in the structural component, resulting in the reduction of the mechanical properties, especially the fatigue properties of the structural component;

The additive manufacturing technology using linear friction welding has high requirements for the equipment, and it is difficult to form structural component with certain complex shapes point by point and line by line according to the track.

FIG. 1 is a flow diagram of the solid composite additive manufacturing method for a high-performance structural component provided by the embodiment of the present invention. As shown in FIG. 1, the method includes the following steps:

S1: The raw materials of solid composite additive is heated to the solid solution temperature.

In this step, the raw material can be cast material or any applicable material form, and heated to the solid solution temperature, generally 0.3~0.75Tm, where Tm is the melting point of the material.

S2: the rod-shaped raw material of the solid composite additive after solution is loaded into the extrusion die and is extruded into a set shape.

In this step, the material after solid solution is loaded into the extrusion die, and the raw material is extruded into a certain shape according to the needs of the component. Generally speaking, it is extruded into narrow strip or narrow plate, and then laid on the previously formed layer.

S3: The raw materials of the extruded solid composite additive are laid on the base plate layer by layer according to the track by a rolling method to form the prefabricated billet of the solid composite additive.

S4: The prefabricated billet is processed by numerical control to obtain metal part.

In this step, pressure connection is used to realize the connection of narrow band or narrow plate along the set track. In conditions of a certain temperature range (temperature range from room temperature to 0.75Tm) and deformation amount, the extruded material attains the connection of the interlayer metal materials through one or two rollers or punches.

As a preferred embodiment, in step S1, the solid solution temperature is 0.3Tm~0.75Tm, where Tm is the melting point of the rod-shaped raw material of the solid composite additive.

As a preferred embodiment, in step S2, the rod-shaped raw material of the solid composite additive after solid solution is loaded into the extrusion die and extruded into the set shape, specifically:

In the vacuum environment or argon environment, the raw materials of the solid composite additive after solid solution are subjected to lateral extrusion through the extrusion head and the extrusion die; The extrusion ratio of the lateral extrusion is 5~15.

As a preferred embodiment, in step S3, the raw material of the extruded solid composite additive is laid on the base plate layer by layer according to the track by the pressure connection method such as rolling to form the prefabricated billet of the solid composite additive, specifically including the following steps:

S301: In the conditions of set temperature and set deformation amount, the pressure is applied on the raw materials of the extruded solid composite additive through rollers or punches;

S302: After the raw materials of the extruded solid composite additive are connected with the base plate, the raw materials of the extruded solid composite additive are stacked layer by layer according to the track to form the prefabricated billet of the solid composite additive.

S303: The prefabricated billet is processed by numerical control to obtain metal parts.

As a preferred embodiment, in step S3, the set temperature is from room temperature to 0.75 Tm, where Tm is the melting point of the raw material of the solid composite additive.

As a preferred embodiment, in step S3, the set deformation amount is 15% to 60%.

As a preferred embodiment, in step S3, when the raw material of the extruded solid composite additive is pressed by the roller, the integrated pressure connection of two symmetrical rollers is used.

As a preferred embodiment, after the rod-shaped raw materials of the extruded solid composite additive are stacked layer by layer according to the track to form the prefabricated billet of the solid composite additive, it further includes:

S4: The prefabricated billet of the extruded solid composite additive is subjected to subsequent heat treatment.

In this step, the formed parts are cooled in the air or argon environment, or other subsequent heat treatment is performed.

Compared with the prior art, the present invention has the following advantages:

1. The engineering materials after additive manufacturing have a uniform tissue state, and the thermal (not hot defects, but metallurgical defects) defects are eliminated, which especially apply to difficult-to-weld materials, such as aluminum alloy, magnesium alloy, titanium alloy, nickel alloy and intermetallic compounds;
2. The grain size is refined and the structural integrity is improved. Extrusion forming and pressure connection process can sharply refine the grain of raw materials, and the compressive stress applied by multiple rollers can reduce the residual stress generated by repeated heating and cooling of materials, so that the parts made by additive manufacturing have better structural integrity;
3. The bonding strength is improved. The pretreatment before pressure connection can effectively refine the microstructure of the material, and more importantly, it can destroy the oxide layer on the free surface, thus the bonding strength of the interlayer materials is significantly improved;
4. The forming freedom is high. The integrated pressure connection of two symmetrical rollers can realize the two-way movement track and improve the efficiency of additive manufacturing;
5. The cost of raw materials is low. Raw materials can be ingots and forgings of various sizes, which reduces the restrictions on raw materials and greatly reduces the cost of raw materials compared with powder.

The present invention is described in detail with specific embodiments

Example 1

The feasibility and effectiveness of pressure connection on the bonding strength and microstructure of solid forming materials were studied. The pressure connection test was carried out with aluminum alloy as an example, and the connection was realized by applying pressure through rolling:

1. The 7075 aluminum alloy rod-shaped raw material 2 is loaded into the extrusion die 3, the vacuum chamber is vacuumed or the air in the glove box is replaced with high-purity argon, and the raw material is heated to 450° C.~500° C.;
2. Extrusion head 1 and extrusion die 3 are used to apply lateral extrusion to the preheated rod-shaped raw materials. During the lateral extrusion forming, the extrusion ratio is 5~15, and the shear stress is applied to the rod-shaped raw materials, which can break the oxide film, and significantly refine the grain; the operation is in the argon or vacuum environment. During the whole forming, the broken surface of the oxide film will not produce a new oxide film;
3. The extruded narrow band 4 is obtained by lateral extrusion. The cross section size of the extruded narrow band 4 is: 2 mm~5 mm (thick)×5 mm~15 mm (wide), the roller 5 follows closely behind the laid narrow strip, and the interlayer connection is realized by applying pressure. The rolling deformation amount is 15%~60%. In this process, the dynamic prefabricated billet interface and the interface of extruded narrow strip 4 will be heated by the roller 5;
4. The narrow band and the base plate 7 or the prefabricated billet 6 are connected by plastic deformation applied during rolling. After the extruded narrow band 4 is connected with the base plate 7, the deposition of single layer of material is realized, and the new layer will continue to lay on the connected layer;

5. The extruded narrow band 4 is cut, the base plate 7 drops the distance of the thickness of the single layer, and then moves in reverse direction to reach the position of the y value of the starting point of the previous layer. The extrusion forming temporarily stops in the process of returning to the starting point, and then the previous process is repeated. The additive manufacturing processing head will continue to extrude the rod-shaped raw material 2, realizing the connection between the extruded narrow band 4 and the previous layer, thus forming a multi-layer part; When the prefabricated billet 6 is formed, the deposition path and pressure connection speed are controlled by the computer to repeat the above process. After forming, the prefabricated billet 6 is cooled in the air or argon environment, and then the subsequent heat treatment is carried out.

Example 2

The feasibility and effectiveness of pressure connection on the bonding strength and microstructure of solid forming materials were studied. The pressure connection test was carried out with aluminum alloy as an example, and the connection was realized by applying pressure through rolling:

1. The 7075 aluminum alloy rod-shaped raw material 2 is loaded into the extrusion die 3, the vacuum chamber is vacuumed or the air in the glove box is replaced with high-purity argon, and the raw material is heated to 450° C.~500° C.;
2. Extrusion head 1 and extrusion die 3 are used to apply lateral extrusion to the pre-heated rod-shaped raw materials. During the lateral extrusion, the extrusion ratio is 5~15, and the shear stress is applied to the rod-shaped raw materials, which can break the oxide film and significantly refine the grain; The operation is in argon or vacuum. During the whole forming, the broken surface of the oxide film will not produce a new oxide film;
3. The extruded narrow band 4 is obtained by lateral extrusion. The cross section size of the extruded narrow band 4 is: 2 mm~5 mm (thick)×5 mm~15 mm (width), the roller 5 follows closely behind the laid narrow strip 4, interlayer connection is achieved by applying pressure, and the rolling deformation amount is 15%~60%.
4. The narrow band and the base plate 7 or the prefabricated billet 6 are connected by plastic deformation applied during rolling. After the extruded narrow band 4 is connected with the base plate 7, the deposition of single layer of material is realized, and the new layer will continue to lay on the connected layer;
5. The extruded narrow band 4 is not cut, the base plate 7 drops the distance of the thickness of the single layer, and then moves in reverse direction to reach the position of the y value of the starting point of the previous layer. The extrusion/rolling forming will not stop in the process of returning to the starting point, so the extruded narrow band 4 will be continuously connected with the upper layer through rolling deformation. The above process is repeated to form a multi-layer part, and the narrow band 4 connected at the last position will be cut. After forming, the prefabricated billet 6 is cooled in the air or argon environment, and then the subsequent heat treatment is carried out.

It should be clear that each embodiment in this specification is described in a progressive manner. The same or similar portion between each embodiment can be referred to from each other. Each embodiment focuses on the differences from other embodiments. The present invention is not limited to the specific steps and structures described above and shown in the figure. In addition, for the sake of simplicity, a detailed description of known methods and techniques is omitted here.

The above is only the embodiments of the present application and is not limited to the present application. Without departing from the scope of the present invention, the present application may have various modifications and changes for the person skilled in the art. Any modification, equivalent replacement, improvement, etc. made in the spirit and principle of the present application shall be included in the scope of claims of the present application.

What is claimed is:

1. A solid composite additive manufacturing method for high-performance structural component, comprising the following steps:

heating a rod-shaped raw material of the solid composite additive to a solid solution temperature, wherein the rod-shaped raw material is prepared by a casting method;

loading the rod-shaped raw material of the solid composite additive after it is heated to the solid solution temperature into an extrusion die and extruding the rod-shaped raw material into a set shape;

laying the extruded raw material of the solid composite additive on a base plate layer by layer according to a track by a rolling method to form a prefabricated billet of the solid composite additive; and processing the prefabricated billet by a numerical control operation to obtain a metal part, wherein the laying step comprises the following steps:

under conditions of set temperature and set deformation amount, pressing the extruded raw material of the solid composite additive by at least one roller, wherein the extruded raw material and the base plate or the prefabricated billet are connected by plastic deformation applied during rolling;

after the extruded raw material of the solid composite additive are connected with the base plate, stacking the extruded raw material of the solid composite additive layer by layer according to the track to form the prefabricated billet of the solid composite additive.

2. The solid composite additive manufacturing method for the high-performance structural component according to claim 1, wherein the solid solution temperature is 0.3Tm~0.75Tm, wherein Tm is the melting point of the raw material of the solid composite additive.

3. The solid composite additive manufacturing method for high-performance structural component according to claim 1, wherein the loading step comprises:

in a vacuum environment or argon environment, extruding the rod-shaped raw material of the solid composite additive after it is heated to the solid solution temperature laterally by an extrusion head and the extrusion die; wherein the extrusion ratio of lateral extrusion is 5~15.

4. The solid composite additive manufacturing method for the high-performance structural component according to claim 1, wherein the set temperature is from room temperature to 0.75 Tm, wherein Tm is the melting point of the raw material of the solid composite additive.

5. The solid composite additive manufacturing method for the high-performance structural component according to claim 1, wherein the set deformation amount is 15%~60%.

6. The solid composite additive manufacturing method for the high-performance structural component according to claim 1, wherein the extruded raw material of the solid composite additive is pressed by two symmetrical rollers, and an integrated pressure connection is achieved.

7. The solid composite additive manufacturing method for the high-performance structural component according to claim 1, wherein stacking the extruded raw material of the solid composite additive layer by layer according to the track by a rolling method to form the prefabricated billet of the solid composite additive further comprises:

subjecting the prefabricated billet of the extruded raw material of the solid composite additive to a subsequent heat treatment.

* * * * *